United States Patent Office 3,462,509
Patented Aug. 19, 1969

3,462,509
SEPARATION OF p-XYLENE FROM A C$_8$ AROMATIC HYDROCARBON MIXTURE BY CRYSTALLIZATION
Thorpe Dresser, Markham, Stanley Ohlswager, Matteson, and Robert Edison, Olympia Fields, Ill., assignors to Sinclair Research, Inc., New York, N.Y., a corporation of Delaware
No Drawing. Filed May 22, 1967, Ser. No. 640,413
Int. Cl. C07c *15/08, 7/14*
U.S. Cl. 260—674     14 Claims

ABSTRACT OF THE DISCLOSURE

Paraxylene of at least 99 mol percent purity is separated from a C$_8$ aromatic hydrocarbon mixture in two crystallization stages by cooling the mixture (e.g. to below about −60 to −100° F.) to crystallize substantially only paraxylene which is separated as a cake and washed with toluene (e.g. in an amount of about 0.5 to about 3 parts of toluene per part of liquid occluded in the separated cake), melting the washed cake and removing toluene to provide a paraxylene product of about 90 to 98 mol percent purity; cooling the paraxylene product (e.g. at a temperature of about 0 to 40° F.) to recrystallize substantially only the paraxylene which is separated as a cake of less than 99 mol percent purity and washed with toluene (e.g. in an amount of about 0.25 to about 3 parts toluene per part of liquid occluded in the separated cake), melting the washed cake and removing toluene.

---

It has been the practice to separate paraxylene from hydrocarbon mixtures predominating in C$_8$ aromatic hydrocarbons by crystallization since separation of this aromatic hydrocarbon by distillation is generally impractical or uneconomic due to the close proximity of the boiling point of paraxylene to its isomers, especially metaxylene, present in such mixtures. Since the paraxylene to be separated and its C$_8$ isomers reportedly form an eutectic mixture at a certain temperature, crystallization processes have been developed to avert the formation of an eutectic mixture of the desired paraxylene and its close boiling isomers by cooling the mixture just short of the point where the first eutectic of the paraxylene with its accompanying compounds is formed.

Inasmuch as a single crystallization produces products having a purity well below 100%, the product is usually recrystallized to increase purity. In these two-stage crystallization or purification processes, the first crystallized product, generally obtained as a cake by centrifugation, will usually have a solids content of about 70 to 90 weight percent and the second stage centrifuge cake may have a solids content in the range of about 90 to 97 weight percent. For obtaining paraxylene of a given purity, the temperature required in the second step is dependent on the dryness of the cake which can be obtained, higher temperatures resulting in greater amounts of paraxylene in the second stage filtrate. One might expect that at least 99 mol percent purity paraxylene, for instance, could be obtained by operating under high enough temperatures in the second stage crystallization to increase the percent of paraxylene in the filtrate. Attainment of at least 99% purity paraxylene under this method has been difficult, if not impossible, to achieve as demonstrated in U.S. Patent No. 2,866,833 to Charles A. Spiller. In addition, as the patent points out, increasing the second stage temperature increases the amount of filtrate which must be recycled to the first stage which in turn greatly increases the refrigeration load and centrifuge capacity required in a commercial plant. The patentee apparently alleviated these problems and was able to produce paraxylene of at least 99 mol percent purity by employing yet a third stage recrystallization step. Employment of a third recrystallization step, however, also necessitates additional equipment and utilities and is therefore disadvantageous from a cost standpoint.

It is also conceivable that a product of at least 99 mol percent purity might be obtained by increasing, for instance, the spin time or gravitational force of the second stage centrifuge. These operations have also proved unsatisfactory or inconvenient since increasing the spin time generally still leaves in the cake a residual amount of occluded, relatively impure liquid while the employment of apparatus possessing sufficient gravitational force has been impractical either from a cost or availability standpoint.

It has now been discovered that paraxylene having a mol percent purity of at least 99% can be obtained in a two-stage recrystallization purification system by employing the process of the present invention. In accordance with this process a hydrocarbon feed containing paraxylene is cooled to crystallize substantially only the paraxylene. The crystals are separated as a cake from the bulk of the mother liquor as by centrifugation. The solids content of the cake, which will contain occluded liquid, will vary depending on the efficiency of the crystallization and separation operation but will generally be as aforementioned in the vicinity of about 70 to 90%. The cake is then washed with toluene in an amount, for instance, of about 0.5 to 3 parts by volume of toluene per part of occluded liquid in the cake, yielding, after removal of toluene by, for example, fractional distillation, paraxylene of about 90 to 98% purity which is again cooled to crystallize substantially only paraxylene. The second crystallization may be at a higher temperature than the first, e.g. at about 0 to 40° F. Separation, as by centrifugation, produces (1) a second stage filtrate, a portion of which may be recycled to the second stage crystallizer to control solids content and the remainder joined with the feed to the first stage crystallizer; and (2) a paraxylene cake which has a purity of less than 99 mol percent, and which occludes after centrifugation a maximum of about 10% liquid, preferably about 3 to 7%. This occluded liquid will usually contain about 40 to 80% of paraxylene. The crystal cake is again washed with toluene in an amount sufficient to effect displacement of enough occluded liquid in the cake to yield a paraxylene product of at least 99 mol percent purity upon separation of the toluene. Usually the amount of toluene wash employed in the second stage wash operation is at least about 0.25 part up to about 3 parts by volume of toluene per part of occluded liquid in the cake.

Wash temperatures of, for instance, the first stage cake temperature or lower to 110° F. may be employed in the first stage wash operation with toluene. The lower wash temperatures may reduce paraxylene loss to the wash liquid but has the attendant disadvantage of increased cooling costs. Temperatures of the order of about 70 to 110° F. have been found to be especially useful and, of course, avoid the necessity of cooling the wash liquid. The wash temperature employed in the second stage wash operation is at least about the temperature of the second stage cake and preferably is about 5° F. higher than the second stage cake temperature. Wash temperatures, however, of up to about 110° F. may be employed in the second stage wash operation.

Unlike other wash operations, for example, wash operations employing paraxylene as a wash medium, the wash operation employing toluene of the present invention presents no plugging problems created by crystallization of the wash medium at the cake temperature. Also, the wash operation employing toluene is highly efficient in displacing occluded liquid from both the first and the second stage cakes. The first stage wash results in less materials other than paraxylene being fed to the second stage and consequently less recycle of material from the second stage to the first stage. The second stage wash operation permits the use of second stage crystallization temperatures which are lower than the crystallization temperatures required to obtain the desired high purity product when a less efficient wash operation is employed. The ability to use lower temperatures without the loss of high purity in the product allows for a larger portion of second stage feed to be crystallized and a reduction in the paraxylene recycled to the first stage. Consequently, the two-stage crystallization process of the present invention is characterized by high capacity and a reduced recycle rate to the first crystallization stage with a decrease in both the first and second crystallization stage refrigeration loads. The reduction in refrigeration load permits an increase in feed throughput.

It is preferred that the amount of toluene employed in the wash operations of the process of the invention be that sufficient to effectively displace the occluded liquid in the separated cake without breaking through the cake to contaminate the wash effluent. In accordance with this preferred embodiment of the invention a further advantage is offered in that the wash effluent from the second stage crystallization may be essentially free of toluene and has essentially the same paraxylene content as the second stage filtrate recycled to the first stage crystallizer. Thus the second stage wash effluent may be combined with the filtrate recycled to the first stage crystallizer if desired. Should wash operation conditions be employed, however, that effect excessive toluene "breakthrough" it may be necessary to remove the toluene from the wash effluent if the presence of toluene in the first stage is undesirable.

Suitable crystallization feeds for paraxylene recovery process of the present invention are, for example, $C_8$ hydrocarbon fractions, boiling in the range of about 250 to 295° F. and predominating in $C_8$ aromatics, which contain at least about 5% by weight paraxylene, preferably at least about 8%. Typical feeds contain about 10 to 50% or more of the desired product. Commonly a $C_8$ feed contains about 5 to 30% paraxylene, and includes in admixture one or more of the other xylenes, e.g., about 5 to 60% metaxylene and a minor amount of ethylbenzene. Minor amounts of paraffins and other aromatics may be also present.

The temperautre to which the hydrocarbon feed is cooled in the first stage is that at which essentially only paraxylene is crystallized without its accompanying isomers. As a general rule the hydrocarbon feed is cooled to a temperature at least slightly above the eutectic temperature of the paraxylene to be separated and the first eutectic-forming compound in the mixture, in other words, slightly above the temperature at which a component other than the paraxylene would be solidified. The temperature at which paraxylene and various eutectics solidify is dependent on the amount and nature of other hydrocarbons or diluents which may be present in the hydrocarbon feed but simple routine cooling tests or analysis on any particular feed are sufficient for determining the temperature to which an initial charge should be cooled to obtain the crystallization of the paraxylene without apprecibale amounts of eutectics or other components. In the case of paraxylene recovery from a hydrocarbon fraction predominating in $C_8$ polyalkylated benzenes the first stage cooling temperature is usually below about $-60°$ to say about $-100°$ F.

The cake of paraxylene from the first centrifuge operation is melted and toluene removed by, for example, fractional distillation. Since the content of the melted cake after removal of toluene is substantially paraxylene it can be crystallized in the second stage crystallization step at a higher temperature than the first crystallization operation. Generally the cooling temperature in the second stage is about 0 to 40° F. Employment of a cooling temperature above about 40° F. results in yield loss and increases the amount of filtrate recycled to the first stage. Cooling to a temperature below about 0° F., on the other hand, may curtail the drainage rate of the occluded liquid in the cake and is disadvantageous from the standpoint of the size of crystals formed.

The centrifuges employed in separating the crystals in both the first and second stages may be operated at approximately the same temperature ranges as employed in the respective crystallizers of each stage and are run at a rate sufficiently high to imposed a centrifugal force, adequate for giving a crystal cake of the desired solids content, usually in the range of about 400–1000 times gravity. The centrifuges will be equipped with means for introducing the liquid wash of the present invention, and in the case of toluene "breakthrough" as described above the second stage centrifuge can be equipped with a diverter means to keep the centrifuge filtrate or mother liquor separate from the toluene wash effluent.

The following example is included to further illustrate the present invention but is not to be considered limiting.

EXAMPLE 10,463 barrels per day of a $C_8$ aromatic hydrocarbon fraction boiling in the range of about 275 to 295° F. containing 23.8% paraxylene, 11.8% orthoxylene, 51.8% metaxylene, and 12.6% by weight ethylbenzene combined with 124 barrels per day of filtrate recycled from a second stage centrifuge are charged to a crystallization unit. The feed is cooled to about $-80°$ F. in a first stage crystallizer and the resulting slurry of paraxylene crystals and mother liquor is then transferred to the first stage centrifuge where a yield of 1728 barrels per day of impure cake is separated from the mother liquor by centrifugal filtration. The mother liquor is withdrawn from the centrifuge and yielded as filtrate product. The cake, which accumulated on the centrifuge basket screen, occluded liquor to the extent that the cake consisted of 85% solids and 15% liquid. The solids portion of the cake is 100% paraxylene. The occluded liquid has the same composition as filtrate, i.e., 11.2% paraxylene, and is washed with toluene in an amount of about 15% of the melted cake quantity, which is about 1 part toluene per part of occluded liquid in the cake. The cake is then unloaded from the basket by a knife and dropped into a melt tank where it is melted. The purity of this melt is 88% paraxylene.

The melt is fractionally distilled to remove toluene yielding a paraxylene product containing 95.5% paraxylene which is recrystallized by cooling in the second stage crystallizer to about 25° F. and centrifuged. Mother liquor (124 barrels per day) containing 63% paraxylene is withdrawn from the centrifuge and recycled back to the first stage feed. The solids portion of the cake is 100% paraxylene. The cake occluded liquor (which contains 63% paraxylene) to the extent that the cake consisted of 95% solids and 5% liquid. If, as done by previous operations, the cake is now removed from the basket, the purity of this cake (which would be final product) would be 98.2% paraxylene. However, at this point, a wash of toluene is injected into the centrifuge basket. The quantity of this wash is about 3% of the melted cake quantity, which is about 0.6 part of toluene per part of occluded liquid in the cake. Wash effluent is recycled, after removal of toluene, to the first stage feed. Following the wash the cake is melted and subjected to distillation to fractionate the toluene and obtain a product of approximately 99.4% paraxylene.

It is claimed:

1. In a two-stage purification process for separating paraxylene from an aromatic hydrocarbon fraction predominating in $C_8$ aromatics, including metaxylene and containing at least about 5 to 50% paraxylene, the steps comprising cooling the fraction to crystallize substantially only paraxylene, separating paraxylene crystals as a cake from the bulk of the mother liquor by centrifugation, washing the separated cake with toluene in an amount sufficient to provide after melting the washed cake and separating toluene therefrom, a paraxylene product of about 90 to 98 mol percent purity, recrystallizing substantially only the paraxylene from said product, subjecting the resulting slurry of paraxylene crystals to a second centrifugation to separate a cake of paraxylene of less than 99 mol percent purity, and washing the separated cake with toluene in an amount sufficient to provide a paraxylene product of at least 99 mol percent purity.

2. The method of claim 1 wherein the amount of toluene employed in the first toluene wash is about 0.5 to about 3 parts of toluene per part of liquid occluded in the cake separated by the first centrifugation.

3. The method of claim 2 wherein the amount of toluene employed in the second toluene wash is at least about 0.25 to about 3 parts of toluene per part of liquid occluded in the cake separated by the first centrifugation.

4. The method of claim 3 wherein the aromatic hydrocarbon fraction contains about 8 to 30% paraxylene.

5. The method of claim 3 wherein the temperature of the toluene in the first toluene wash operation is about the temperature of the second stage cake to 110° F.

6. The method of claim 4 wherein the temperature of the toluene in the second toluene wash operation is at least about the temperature of the cake separated by the second centrifugation up to about 110° F.

7. The method of claim 1 wherein the filtrate separated from the cake of paraxylene by the second centrifugation is recycled and joined with the feed to the first crystallization stage.

8. In a two-stage purification process for separating paraxylene of at least 99 mol percent from a $C_8$ aromatic hydrocarbon feed containing about 8 to 30% paraxylene in admixture with other $C_8$ xylene isomers and ethylbenzene, the steps comprising cooling the feed to crystallize substantially only the paraxylene, separating paraxylene crystals as a cake from the bulk of the mother liquor by centrifugation, washing the cake with toluene in an amount of about 0.5 to 3 parts toluene per part of occluded liquid in the cake, melting the cake and separating toluene therefrom, recrystallizing substantially only the paraxylene at a temperature of about 0–40° F., subjecting the resulting mixture of paraxylene crystals and mother liquor to a second centrifugation to separate a cake of paraxylene crystals of less than 99% purity containnig a maximum of about 10 weight percent occluded liquid and washing the separated cake with at least about 0.25 to about 3 parts of toluene per part of occluded liquid.

9. The method of claim 8 wherein the first cooling operation is conducted at a temperature of below about −60° F. to about −100° F.

10. The method of claim 9 wherein the amount of occluded liquid in the cake separated by the second centrifugation is about 3 to 7%.

11. The method of claim 9 wherein the temperature of the toluene in the first toluene wash operation is about 70 to 110° F.

12. The method of claim 11 wherein the temperature of the toluene in the second toluene wash operation is about 5° F. higher than the temperature of the cake separated by the second stage centrifugation.

13. The method of claim 8 wherein the filtrate separated from the cake of paraxylene by the second centrifugation is recycled and joined with the feed to the first stage crystallizer.

14. The method of claim 8 wherein the wash effluent obtained from the second stage toluene wash is recycled, after removal of toluene, and joined with the feed to the first crystallization stage.

References Cited

UNITED STATES PATENTS 2,795,634  6/1957  Hoff et al. _____ 260—674

FOREIGN PATENTS 571,632  3/1959  Canada.
949,161  2/1964  Great Britain.

DELBERT E. GANTZ, Primary Examiner
C. R. DAVIS, Assistant Examiner